United States Patent [19]

Dummersdorf

[11] Patent Number: 5,718,846
[45] Date of Patent: Feb. 17, 1998

[54] PROCESS FOR MASS TRANSFER USING FLUIDIZED BED BODIES

[75] Inventor: Hans-Ulrich Dummersdorf, Leverkusen, Germany

[73] Assignee: Bayer Aktiengesellschaft, Leverkusen, Germany

[21] Appl. No.: 665,112

[22] Filed: Jun. 14, 1996

Related U.S. Application Data

[60] Continuation of Ser. No. 404,392, Mar. 14, 1995, abandoned, which is a division of Ser. No. 191,569, Feb. 3, 1994, abandoned.

[30] Foreign Application Priority Data

Feb. 10, 1993 [DE] Germany ............ 43 03 838.7

[51] Int. Cl.$^6$ ............... B01D 47/16
[52] U.S. Cl. ............... 261/94; 261/DIG. 72; 422/139; 95/211
[58] Field of Search ............... 422/139, 177, 422/190, 211, 311; 502/439, 527; 261/94, DIG. 72; 201/31; 55/233; 95/210, 211

[56] References Cited

U.S. PATENT DOCUMENTS

| | | | |
|---|---|---|---|
| 2,055,162 | 9/1936 | Weber | 261/94 |
| 2,212,932 | 8/1940 | Fairlie | 261/94 |
| 2,381,119 | 8/1945 | Dill . | |
| 3,350,075 | 10/1967 | Douglas . | |
| 3,810,348 | 5/1974 | Byers et al. | 55/91 |
| 3,826,240 | 7/1974 | Miyahara | 261/DIG. 72 X |
| 3,925,024 | 12/1975 | Hollingsworth et al. | 422/143 |
| 4,014,962 | 3/1977 | del Notario | 261/112 |
| 5,200,119 | 4/1993 | Leva | 261/94 |
| 5,376,165 | 12/1994 | Ruff et al. | 95/212 |

FOREIGN PATENT DOCUMENTS

| | | |
|---|---|---|
| 9108048 | 6/1991 | European Pat. Off. . |
| 1347507 | 11/1963 | France . |
| 1483819 | 6/1967 | France . |
| 448380 | 8/1927 | Germany . |
| 6918394 | 7/1969 | Germany . |
| 2020144 | 2/1972 | Germany . |
| 3613151 | 10/1987 | Germany . |
| 1088763 | 4/1984 | U.S.S.R. . |
| 1204781 | 9/1970 | United Kingdom . |

*Primary Examiner*—Christopher Kim
*Attorney, Agent, or Firm*—Sprung Kramer Schaefer & Briscoe

[57] ABSTRACT

In mass transfer columns, particularly in distillation and extraction columns, fluidised bed bodies are frequently used to improve mass transfer. A substantial improvement in the mass transfer rate may be achieved if asymmetrically shaped fluidised bed bodies are used, which are characterised in that their geometric center does not coincide with the center of mass, whereby the geometric center is defined as the point of intersection of the body diagonals of the smallest possible right parallelepiped completely enveloping the fluidised bed body. Typical examples of such shapes are bird's egg-shaped or drop-shaped bodies. Apart from the improvement in mass transfer, a reduction in the specific pressure drop may also be achieved with such fluidised bed bodies.

5 Claims, 6 Drawing Sheets

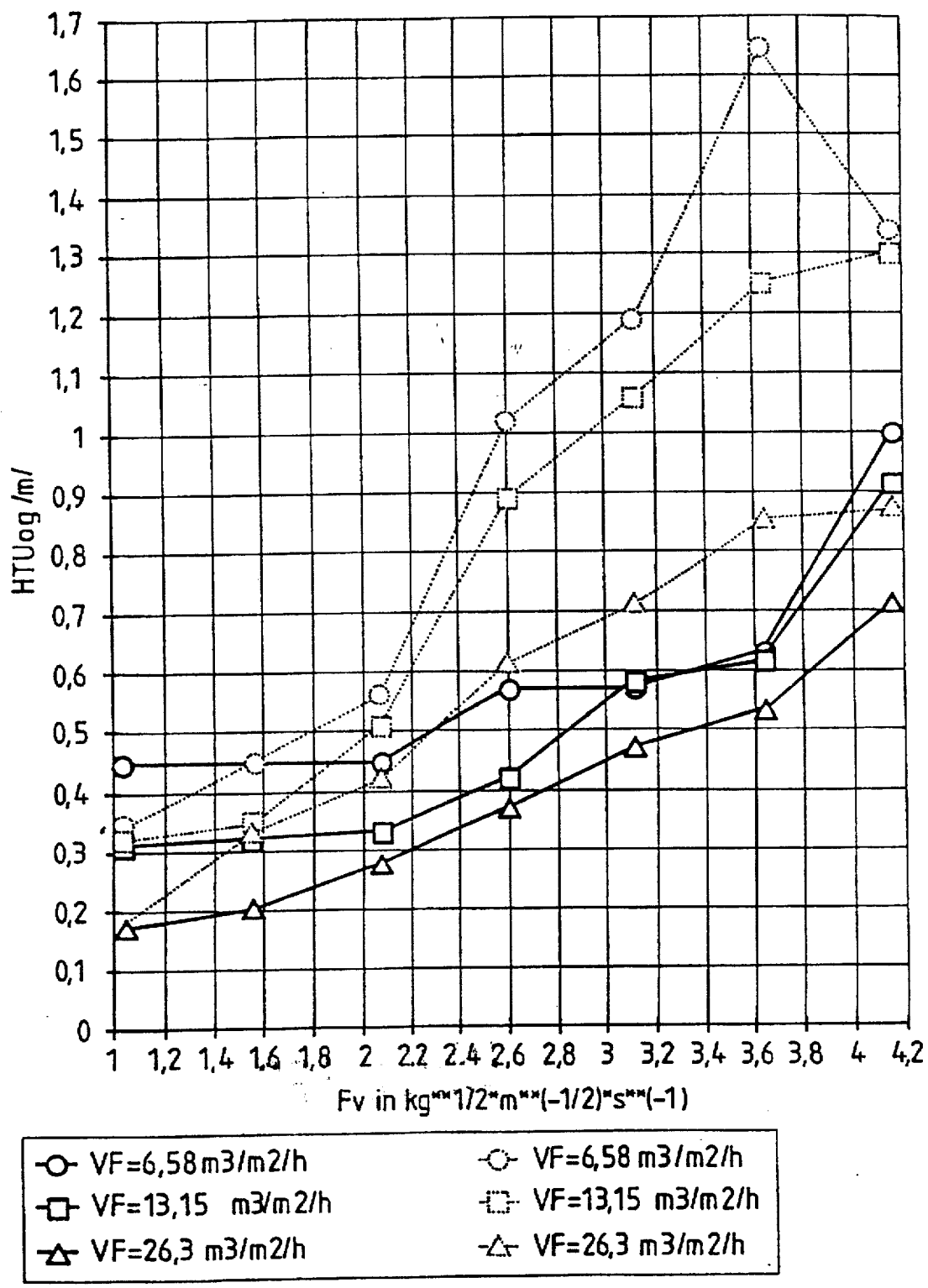

PROCESS FOR MASS TRANSFER USING FLUIDIZED BED BODIES

This application is a continuation of application Ser. No. 08/404,392, filed on Mar. 14, 1995 which is abandoned, which is a Division of Ser. No. 08/191,569 filed on Feb. 3, 1994 which is abandoned.

The invention relates to a fluidised bed body for mass transfer in a fluidised bed, particularly mass transfer by absorption, desorption, distillation, extraction and dust separation. Mass transfer processes like the ones mentioned above, which are characterised in that gaseous, liquid or solid substances are transferred from a liquid or gas phase to another liquid or gas phase, or solid from a gas to a liquid phase (dust separation), are carried out in corresponding mass transfer apparatus—mainly columns. Depending on the form of phase contact by means of mass transfer-improving fittings, a distinction is made, apart from special forms for extraction, essentially between plate columns and packed columns. In plate columns, the phases to be brought into the mass transfer are brought into intensive contact with each other on discrete plates, whilst packed columns have a continuum of fittings composed of irregularly arranged specific moulded bodies.

Packings used are the Raschig rings or Berl saddles which have been well known traditionally for a long time; new, modern types of packing such as Ralu rings, Torus saddles or Tellerettes have a grid structure and, in contrast to the afore-mentioned, use not the geometric surface but drop and strand formation inside them for mass transfer. In addition, hydrophilic types are on the market which permit better wetting of the packing surface. Generally, it may be said that there exists an almost indeterminable variety of shapes which differ only insignificantly in terms of the hydrodynamics and mass transfer characteristics. Packed columns with fixed, regularly arranged packings likewise have the continuum of fittings described, but have a regular geometric structure. They are characterised by a large mass transfer area, low pressure drops and a low potential liquid loading. Examples thereof are various designs of Sulzer or Montz packings. Recently, a relatively new process was developed mainly for absorption—absorption in the fluidised bed according to DE-PS 3 613 151. In said process, several fluidised beds are formed in a column in several fluidised chambers with specifically ellipsoidal fluidised bed elements, in which beds mass transfer may be intensified in comparison with static packings, with the result that corresponding columns have a lower height than, for example, packed columns. Due to the higher gas loading capacity (flood point) of such fluidised beds, it becomes possible to operate gas loadings up to 4 m/s (packed columns approx. 2 m/s). This produces the advantage that fluidised bed columns may be built not only lower but also with a smaller diameter compared with packed columns—with the same separating capacity. A disadvantage, however, is that the advantageous properties of packed columns cannot be achieved with the ellipsoids as contacting elements defining the state of the art.

The object was to find possibilities of improving substantially the hydrodynamic behaviour and the mass transfer characteristics in a fluidised bed, thus increasing the gas loading capacity of the fluidised bed column, reducing the specific pressure drops and increasing the mass transfer rate.

The object of the invention is achieved in that the fluidised bed bodies forming the fluidised bed obtain a different geometric shape than is hitherto customary. Unlike the hitherto customary cone shapes or ellipsoidal shapes, fluidised bed bodies are used whose shape has a characteristic asymmetry. According to the invention, said asymmetry is characterised in that the geometric centre defined as the point of intersection of the body diagonals of the smallest possible right parallelepiped completely enveloping the fluidised bed body does not coincide with the centre of mass of the fluidised bed body.

Typical examples of such a shape are hen's (bird's) egg-shaped or drop-shaped structures. By way of abbreviation, mention will always be made hereinafter of a hen's egg-shaped fluidised bed body as a typical representative of the embodiments according to the invention. Starting from considerations about the hydrodynamic behaviour of such bodies described above in the fluidised bed, which will be explained in more detail below, it was also found, surprisingly, by experiment that when fluidised bed bodies of such a shape are used, the mass transfer in the fluidised bed may be increased decisively compared with the ellipsoids representing the state of the art, and at the same time the specific pressure drop per transfer unit may likewise be reduced to a surprising extent. This circumstance is also contradictory to a certain extent to the conventional experiences in process technology, to the effect that an increase in mass transfer in any system must usually be achieved at the expense of an increase in the pressure drops (=greater expenditure of energy).

The effect of the hen's egg-shaped fluidised bed bodies in the fluidised bed can be explained in the following way and also observed by experiment. The geometric structure of the egg-like fluidised bed body leads to a more favourable flow behaviour both in the gas stream and in the liquid stream moving in the opposite direction. The stream is predominantly in closer contact with the surface of the egg-shaped fluidised bed bodies and there is no break in the flow boundary layer and the associated pressure drops. The egg contour is more akin to the shape of an ideal drop of liquid in terms of flow technology. Even if the egg-shaped fluidised bed body is at right angles to the flow, the gas streams occurring are not diverted so sharply from their original direction of flow, as with the ellipsoid fluidised bed bodies, for example, with the result that the pressure drops decrease in this case, too. The crucial positive effect on the improvement in mass transfer must be seen in the fact that the irregularly shaped egg-shaped fluidised bed body, compared with the ellipsoid element with only one principal axis of inertia and one other principal of axis of inertia plane, is permanently rotating about a plurality of spatial axes of inertia within the fluidised bed, i.e., within the already very turbulent, fluidised bed there is also the highly irregular intrinsic rotation (spin and oscillation) of the fluidised bed bodies as a further degree of freedom, which rotation leads to an increase in the turbulences near the individual fluidised bed bodies and thus to a more rapid phase interface regeneration. Due to the mass arranged irregularly about its geometric centre, and thus also the projection area into a plane vertical to the direction of flow, such a body receives a permanent moment of rotation brought about by the flow. Surprisingly, the turbulences triggered additionally in the fluidised bed, evidently caused by the above-mentioned hydrodynamic effect in the opposite direction, are not associated with an increase in the pressure drops but, on the contrary, are associated even with a fall therein. The increase in the mass transfer rate by a multiple, in some cases, is not, therefore, achieved at the expense of a mere increase in the pressure drops but merely by the change in the shape of the fluidised bed bodies. The described changes in the form of the hydrodynamics in the fluidised bed, caused by the shape of the fluidised bed bodies according to the invention, can be observed very well visually by experiment.

The fluidised bed body according to the invention has the following advantages when it is used:

1. Reduction in the column volume in height and diameter
2. Considerable improvement in mass transfer, particularly in the case of high gas and low liquid loadings
3. Lower specific pressure drops, particularly at high gas rates
4. Use instead of expensive packings in broad parameter ranges
5. Saving on investment and operating costs in mass transfer processes, and also particularly for large gas volume streams and flue gases
6. Use of the fluidised bed bodies according to the invention is possible not only for absorption but also for other mass transfer processes (desorption, dust separation, distillation, catalytic reactions in the fluidised bed).

BRIEF DESCRIPTION OF THE DRAWINGS

The invention will be discussed in more detail below on the basis of drawings and examples of execution.

FIGS. 6 to 8: Diagrams with comparative results of measurement for the commercial fluidised bed bodies and those according to the invention.

The absorption of organic pollutants (e.g. acetone) is carried out with the absorbent water in a column (1) which is equipped with two fluidised chambers (2). The solvent conveyed by the solvent pump (3) into the solvent charge (4) is enriched until close to saturation, the solvent charge (4) being heated in a current of nitrogen, and mixed in the mixing section (5) with a stream of ambient air. Absorption takes place in a fluidised chamber (2) of the column (1) by fresh water conveyed by means of the pump (6) from the absorbent charge (7), with which water the column is loaded continuously. The bellows (8) conveys the stream of air to be absorbed into the chimney. The inlet and outlet concentrations in the column are measured by flame ionisation detection and recorded continuously. The plant operates with throughputs on an industrial scale. Fluidised bed bodies according to the invention are used which, corresponding to a hen's egg in terms of their external dimensions of size and shape, are hollow inside and made of plastic. Such a body E is shown, e.g. in FIG. 2. For the purpose of illustration, the completely enveloping right parallelepiped Q is also shown, of which the body diagonals intersect in the geometric centre M. To the right of the geometric centre lies the centre of mass or centre of gravity S of the egg. In the case of such an asymmetrical body, therefore, in contrast e.g. to an ellipsoid, the geometric centre and the centre of gravity do not coincide. FIG. 3 shows another embodiment in which the fluidised bed body has a drop shape. A fluidised bed body with an asymmetrical dumbbell shape is shown in FIG. 4. FIG. 5 shows another example of execution for such irregularly shaped bodies. The criterion for all said bodies is that the centre of gravity lies at a place other than the geometric centre, the geometric centre being defined as the point of intersection of the body diagonals of a right parallelepiped completely enclosing the body.

The bodies may be hollow or solid and are produced advantageously from plastic by injection moulding or blowing.

The height of one transfer unit HUT og (according to the HTU/NTU model; o-overall; g-gas) over the gas loading (Fv factor) with the curve parameter liquid loading of the column is shown in FIG. 6 for the acetone/water system, wherein in one case customary Scrubberfill elements and in the second case hen's egg-shaped fluidised bed bodies according to the invention of insignificantly different weight are used as fluidised bed bodies.

Figure 1:
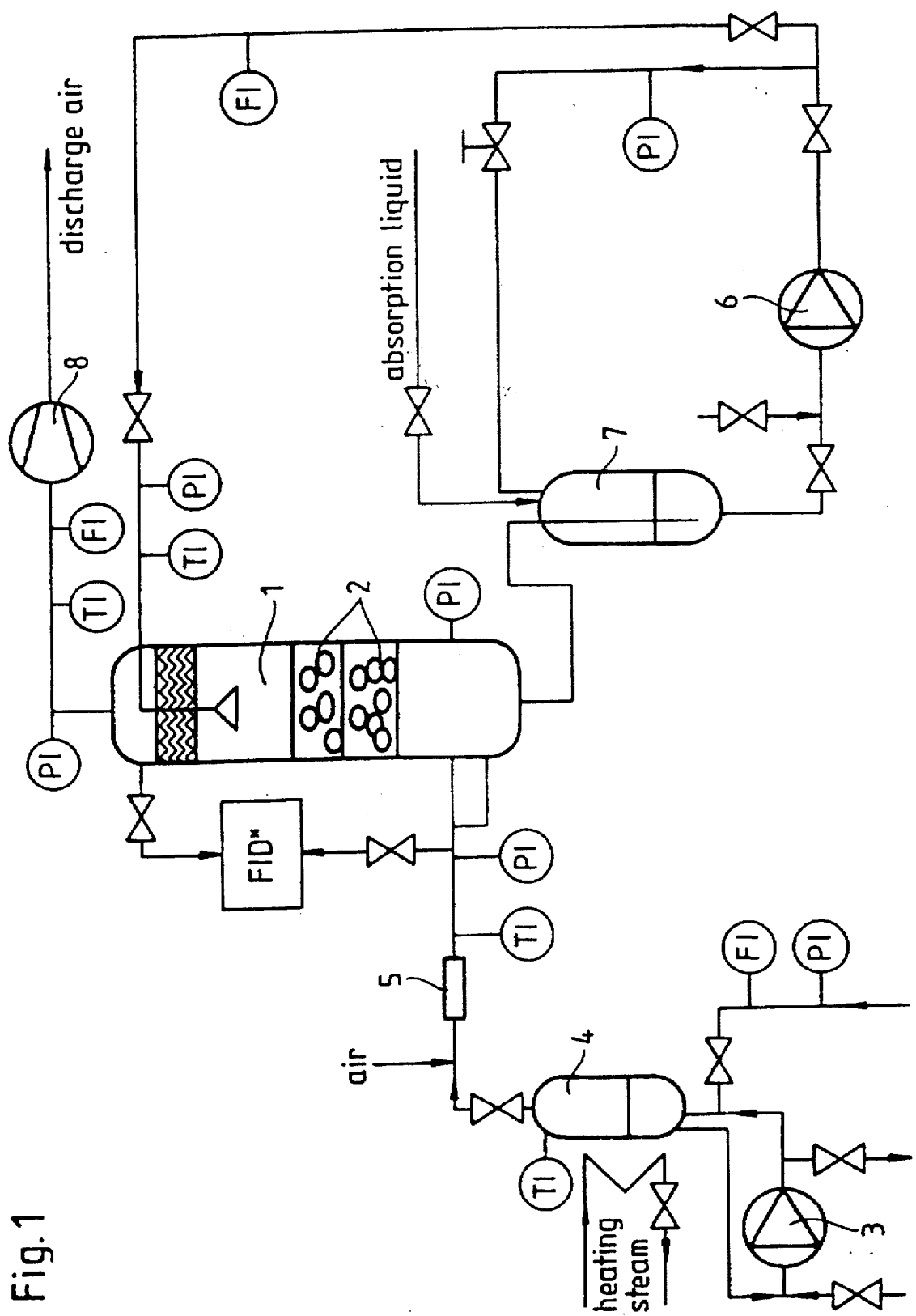
FIG. 1: A flow diagram for an absorption process in a fluidised bed column with the use of the fluidised bed bodies according to the invention
Figure 3:
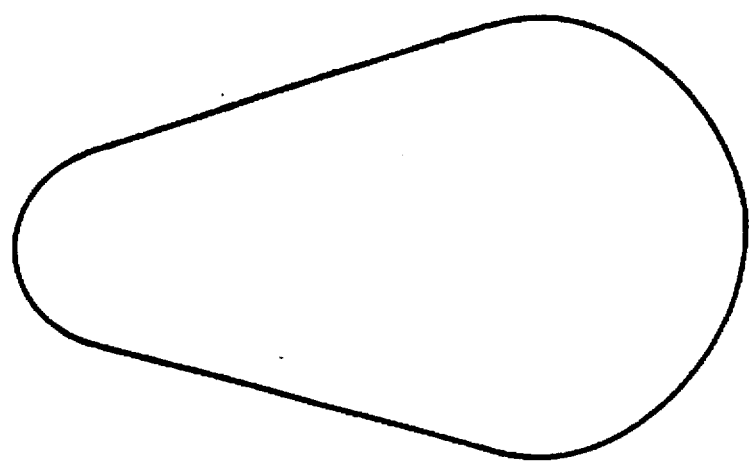
FIGS. 3 to 5: Various embodiments of the asymmetrical fluidised bed body.
Figure 2:
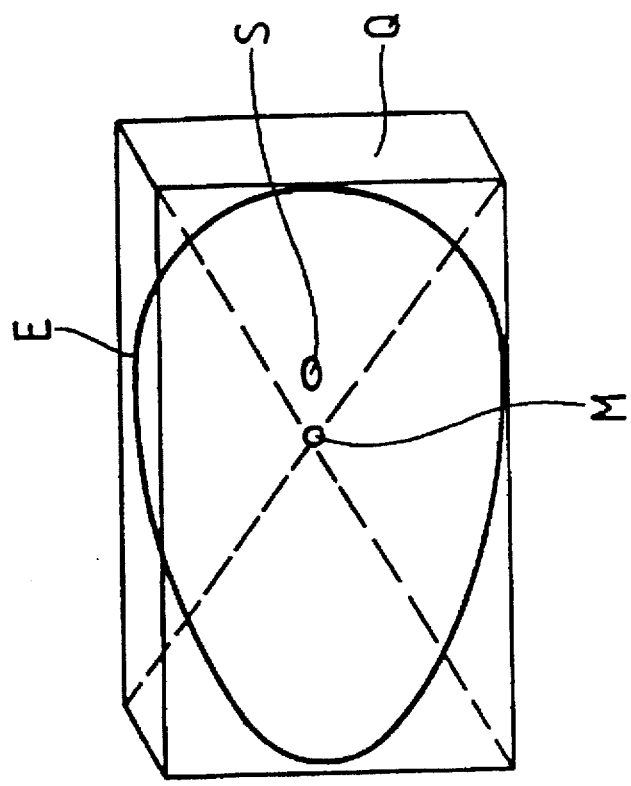
FIG. 2: An egg-shaped fluidised bed body with the enveloping right parallelepiped
Figure 5:
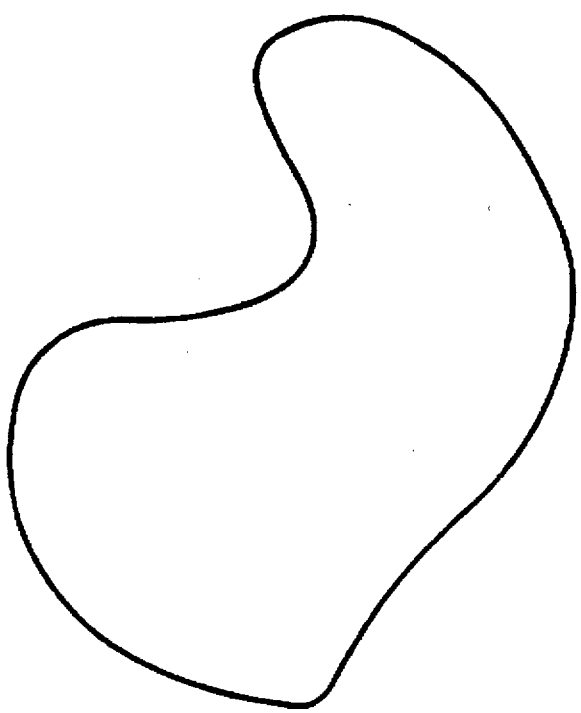
Figure 4:
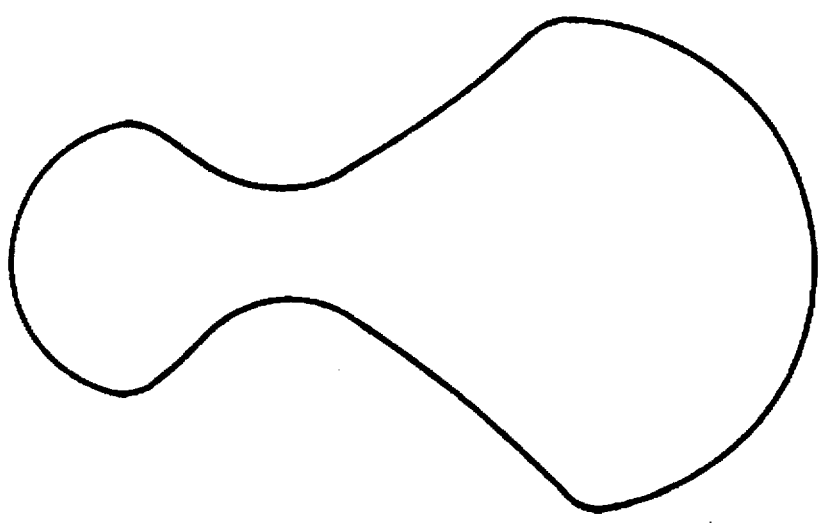
Figure 7:
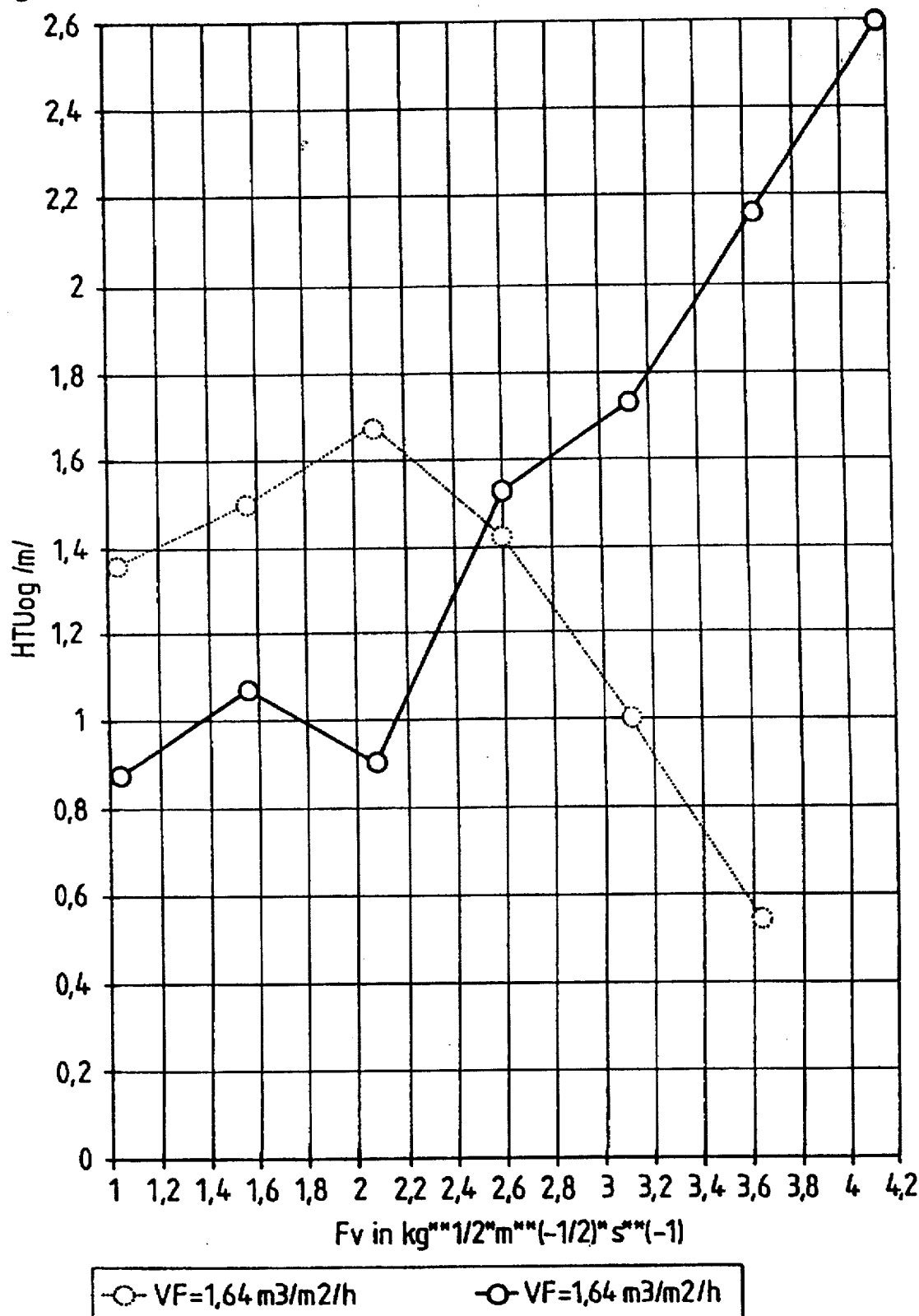
Figure 8:
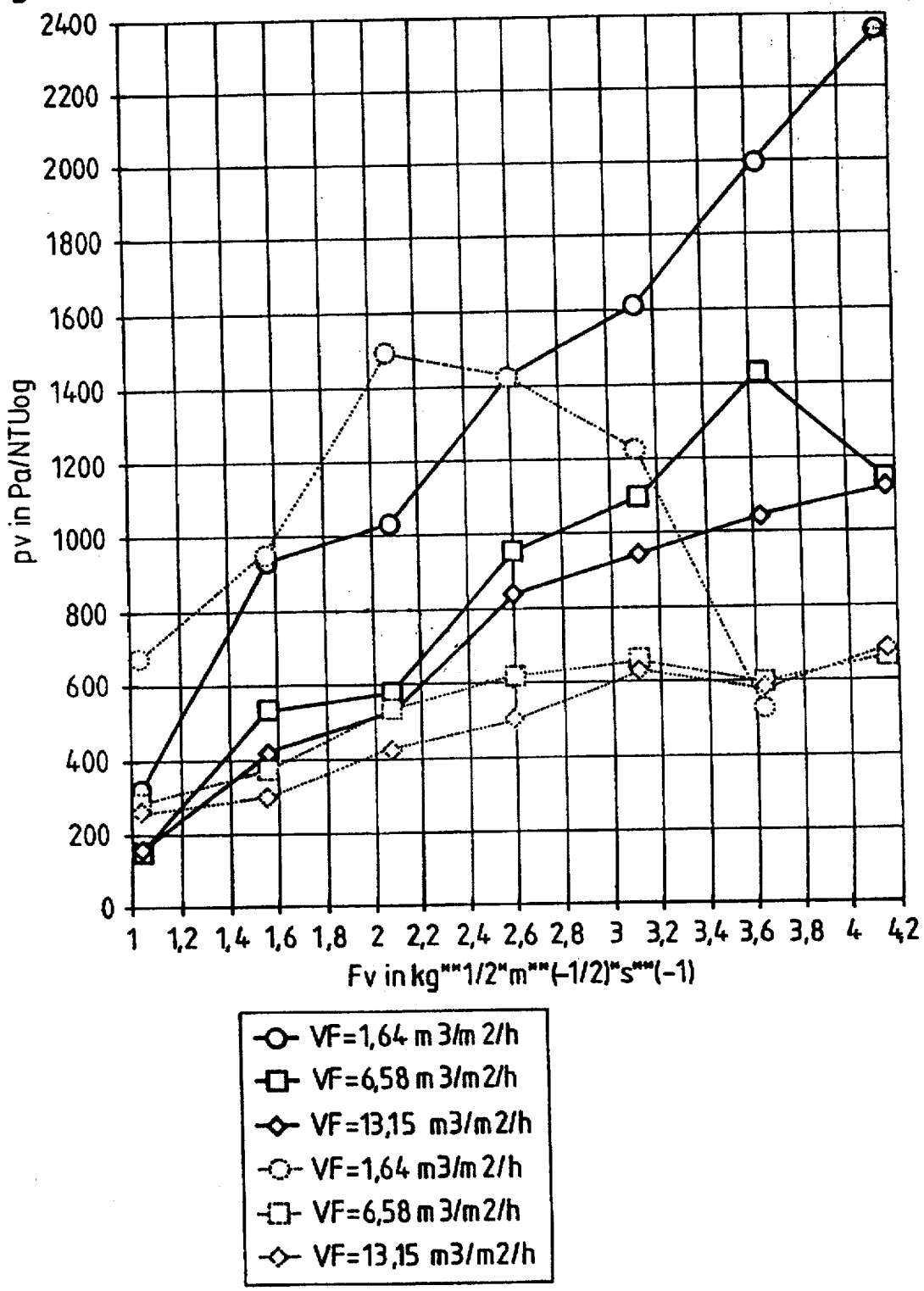

It is evident that with egg-shaped fluidised bed bodies according to the invention, a substantially lower HTU og height may be obtained than with the customary fluidised bed bodies. In practice, this means that the same mass transfer may be achieved with a mass transfer column of low height. This is particularly true in the zone of relatively high gas loadings, which is particularly attractive for mass transfer because of lower investment costs. Whilst hardly any differences in mass transfer become visible in the lower gas loading zone (fluidised bed bodies at rest in the fluidised bed), the efficiency of the elements according to the invention increases sharply in the upper loading zone. Here, too, it can be seen that the fluidised bed body according to the invention has a more advantageous effect the lower the liquid loading, that is, likewise in operating zones of the column that are advantageous for mass transfer purposes. In this case, mass transfer can be increased up to 400% compared with the ellipsoid element—this means a column height of 25% compared with a fluidised bed column equipped with ellipsoid elements. This circumstance can be seen particularly well in FIG. 7, where extremely low liquid loadings of the fluidised bed column are represented. The second surprising effect established was that the specific pressure drop for achieving one transfer unit NTU og not only does not increase, despite a substantial improvement in mass transfer with the use of fluidised bed bodies according to the invention, but even decreases in comparison. In practice, this means that the gas loading of the column may be increased with the same energy costs, or the column diameter and hence the investment costs may be reduced under otherwise identical conditions. The specific pressure drop per transfer unit NTU og for the acetone/water system is shown in FIG. 8, wherein it can be seen that when egg-shaped fluidised bed bodies according to the invention are used, said pressure drop differs considerably from that caused by ellipsoid elements. This in turn is particularly true for the zones of high gas and low liquid loading which are particularly attractive for absorption.

Similarly dramatic differences in terms of mass transfer and pressure drops could also be observed and demonstrated with other mass systems (methanol/water; DMF/water) in a comparison.

I claim:

1. A process for mass-transfer comprising contacting a gaseous phase with a liquid phase in a mass-transfer column in which a non-recirculating fluidized bed containing freely floating fluidized bed bodies is maintained, said fluidized bed comprises asymmetric ovoid bodies, the asymmetric shape of the ovoid bodies having a geometric center, defined as the point of intersection of the body diagonals of the smallest possible right parallelepiped completely enveloping the fluidized bed body, which does not coincide with the center of mass of the bodies, wherein a gas stream is introduced into the mass-transfer column at a velocity such as will cause said bodies to be suspended in said gas stream, thereby forming said fluidized bed, and not be carried out of said fluidized bed, and wherein said velocity results in a turbulent flow which imparts a permanent moment of rotation to said bodies.

2. Process according to claim 1, wherein the ovoid body comprises two arched surfaces which are opposed to each other and have different curvatures.

3. The process of claim 1, wherein said bodies are hollow.

4. The process of claim 1, wherein said bodies are solid plastic.

5. The process of claim 1, wherein said mass transfer column comprises several of said fluidized beds in several fluidized chambers.

* * * * *